(12) United States Patent
Clemens

(10) Patent No.: US 7,785,065 B2
(45) Date of Patent: Aug. 31, 2010

(54) APPARATUS FOR CONVERTING WATER CURRENT INTO ELECTRICITY

(76) Inventor: Mark Hayes Clemens, 485 Beaumont Dr., Vista, CA (US) 92084

( * ) Notice: Subject to any disclaimer, the term of this patent is extended or adjusted under 35 U.S.C. 154(b) by 271 days.

(21) Appl. No.: 12/135,198

(22) Filed: Jun. 8, 2008

(65) Prior Publication Data

US 2008/0303284 A1 Dec. 11, 2008

Related U.S. Application Data

(60) Provisional application No. 60/933,967, filed on Jun. 8, 2007.

(51) Int. Cl.
*F03B 9/00* (2006.01)
(52) U.S. Cl. .................... 415/5; 290/54; 416/8
(58) Field of Classification Search .................. 290/54, 290/43
See application file for complete search history.

(56) References Cited

U.S. PATENT DOCUMENTS

| | | | | |
|---|---|---|---|---|
| 1,625,896 A | * | 4/1927 | Keywood | 416/8 |
| 1,751,513 A | * | 3/1930 | Gaede | 415/5 |
| 2,161,215 A | * | 6/1939 | Wise | 415/5 |
| 3,927,330 A | * | 12/1975 | Skorupinski | 290/54 |
| 4,191,507 A | * | 3/1980 | DeBerg | 416/117 |
| 4,446,378 A | * | 5/1984 | Martinez Parra | 290/54 |
| 4,516,033 A | * | 5/1985 | Olson | 290/54 |
| 5,051,059 A | * | 9/1991 | Rademacher | 415/7 |
| 5,136,174 A | * | 8/1992 | Simoni | 290/54 |
| 6,809,430 B2 | * | 10/2004 | Diederich | 290/54 |
| 7,223,137 B1 | * | 5/2007 | Sosnowski | 440/3 |
| 2008/0272599 A1 | * | 11/2008 | Lok | 290/53 |

FOREIGN PATENT DOCUMENTS

| | | | |
|---|---|---|---|
| DE | 2418660 A | * | 10/1975 |
| FR | 2689184 A1 | * | 10/1993 |
| JP | 56075972 A | * | 6/1981 |

* cited by examiner

*Primary Examiner*—Joseph Waks
(74) *Attorney, Agent, or Firm*—Eric Hanscom; Todd Langford

(57) ABSTRACT

A low-profile apparatus for converting water current into electricity. Fabric scoops are spaced along a continuous belt and, when submerged in a current of moving water, are pushed by the current thereby causing the continuous belt to move. The current pushes the fabric scoops downstream and then fold closed as the fabric scoops are rotated out of the water and travel back upstream. The moving continuous belt is used to turn an electric generator, which causes the apparatus to produce electrical energy. The apparatus includes one or more floats to support the continuous belt, electric generator, and other components of the apparatus. The apparatus can be moored or anchored in a variety of locations where there is moving water or currents. The apparatus maintains a low profile by using fabric scoops that collapse and fold flat when not submerged thereby reducing wind resistance and visible surface area above the waterline.

18 Claims, 1 Drawing Sheet

APPARATUS FOR CONVERTING WATER CURRENT INTO ELECTRICITY

CROSS REFERENCE TO RELATED APPLICATIONS

This application relates to and claims the benefit of U.S. Provisional Application No. 60/933,967 filed Jun. 8, 2007, the entirety of which is hereby incorporated by reference.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of hydroelectric power generation, and more specifically toward a low-profile apparatus for converting water current into electricity. Fabric scoops are spaced along a continuous belt and, when submerged in a current of moving water, are pushed by the current thereby causing the continuous belt to move. The current pushes the fabric scoops downstream and then fold closed as the fabric scoops are rotated out of the water and travel back upstream. The moving continuous belt is used to turn an electric generator, which causes the apparatus to produce electrical energy. The apparatus includes one or more floats to support the continuous belt, electric generator, and other components of the apparatus. The apparatus can be moored or anchored in a variety of locations where there is moving water or currents. The apparatus maintains a low profile by using fabric scoops that collapse and fold flat when not submerged thereby reducing wind resistance and visible surface area above the waterline.

Rising energy costs and continued worries about pollution have led to an increased demand for clean, renewable sources of electrical power. Solar and wind power are common sources of clean energy that continue to grow. Hydroelectric production is another source of clean energy that is widely used throughout the United States and the world.

Hydroelectric energy production, however, has not obtained the same growth rates as solar and wind power, even though rivers and aqueducts remain an enormous untapped clean energy source. One mile of aqueduct that is 40 feet wide and 30 feet deep with a flow rate of 10 miles per hour contains enough kinetic energy to produce 4 million kilowatts per year.

While there are many sources of flowing water that remain untapped, converting these sources into electrical energy using dams is unlikely. Most suitable locations for dams already have one. Further, there are environmental issues that prevent new construction of dams and subsequent power generation.

The prior art has attempted to produce electrical energy from water currents without the use of dams. U.S. Pat. No. 7,063,579 to Voves teaches a boat-like device with an open hull that houses a paddle wheel apparatus. The boat-like device isolates water flowing through the full from the rest of the stream thereby creating unnecessary friction from the water contacting the sides and bottom of the hull. Also, Vove's paddles remain rigid and upright while travelling upstream, requiring additional energy to lift the paddles out of the water and transport them upstream. The rigid and upright paddles travelling upstream above the waterline can also encounter wind resistance, which further lowers the efficiency of the device.

U.S. Pat. No. 7,033,111 to Lee et al. discloses a hydraulic power generating system that includes a looped rail with a plurality of pulleys that move along the rail. Attached to the pulleys are wings which are pushed by a current of water when submerged. As the pulleys travel around the rail, they turn a power generator which converts the kinetic energy into electricity. The system rests on floating buoys that are anchored or moored to a specific location. However, Lee's system has wings that remain rigid and upright while travelling upstream and can encounter wind resistance thereby lowering the overall efficiency of the system.

U.S. Pat. No. 6,809,430 to Diederich teaches a conveyor-type apparatus that includes a series of reversible fluid foils attached along a closed-loop path, such as a chain. The flow of the fluid travels through the apparatus whereby the water travelling across the reversible fluid foils attached to the chain cause the chain to move. The movement of the chain is then converted into electrical energy. The apparatus taught by Deiderich uses Bernoulli's principle to use the reversible fluid foils traveling in both directions to move the chain. However, this configuration can lead to larger inefficiencies because of the drag associated with movement of the reversible fluid foils through the water. Further, the reversible fluid foils are complex structures that are more expensive to produce and maintain than simple fabric sails. Also, the entire apparatus is designed to remain underwater, thereby adding increased resistance to water flow through a channel or aqueduct where the flow of water should not be significantly impeded.

U.S. Pat. No. 2,161,215 to Wise discloses a water current motor that is supported on a pair of spaced pontoons. A series of paddles are connected to a chain where the chain wraps around sprockets. The paddles are rigid and upright as the are submerged and are pushed by the water as it travels between the pontoons. As the paddles rotate out of the water and travel back upstream, they collapse flat thereby reducing any wind resistance associated with the upstream travel of the paddles. The pontoons, however, act to channel the water towards the paddles thereby isolating the water from the whole stream and losing the cohesive collective energy of the movement of the whole body of water. Additionally, the flat and rigid surface areas of the paddles are less efficient at collecting the water current's energy than that of a flexible fabric scoop.

U.S. Pat. No. 5,311,064 to Kumbatovic, U.S. Pat. No. 4,516,033 to Olson, U.S. Pat. No. 4,383,797 to Lee, U.S. Pat. No. 4,301,377 to Rydz, and U.S. Pat. No. 4,136,174 to Simoni disclose devices that use blades that rotate about a single axis. The blades briefly dip into the moving water whereby the water pushes against the blades. These devices, however, are better suited for high-pressure applications where water flow is confined inside a pipe and directed on the surface of the rigid blade. These rotating blades are not efficient at collecting the kinetic energy of a river or aqueduct's relatively slow moving water current.

U.S. Pat. No. 5,684,335 to Ou, U.S. Pat. No. 4,619,582 to Slonim, and U.S. Pat. No. 3,927,330 to Skorupinski teach of devices that use rigid flaps or buckets that travel along a track and are submerged into a stream of moving water to collect the moving water's kinetic energy. Flat and rigid flaps or buckets are less efficient shapes for collecting the water current's energy than that of a flexible fabric scoop. Also, the rigid flaps or buckets are likely to encounter wind resistance while traveling back upstream.

U.S. Pat. No. 6,133,644 to Smith et al., U.S. Pat. No. 5,882,143 to Williams, and U.S. Pat. No. 4,646,022 to Rdyz disclose dams or ground based support systems that house hydroelectric devices. Building dams or ground based support systems in an effort to produce electricity is disadvantageous because of the damage it can cause to the environment, including damage to fish ecosystems that rely on migration up and down these moving bodies of water.

U.S. Pat. No. 3,887,817 to Steelman teaches a device for producing electricity that includes fabric scoops on a conveyor-type belt, where the entire-conveyor-type belt and fabric scoops are located underwater. However, the closed fabric scoops that travel upstream under water encounter substantially more water resistance than fabric scoops travelling upstream above the water.

Thus there has existed a long-felt need for an apparatus to produce electrical energy from moving water currents that is efficient and environmentally friendly. The apparatus should have a low profile outside of the water so that it is not a visual nuisance in the environment and also to reduce wind resistance. The scoops used to catch the moving water should have a large surface area under water and a small surface area above the water. The scoops should have a shape that is formed by the current to efficiently capture the kinetic energy of relatively slow-moving water currents. The apparatus itself should have a small or low-profile underwater, except for the scoops themselves, to reduce the loss of the cohesive collective energy of the movement of the whole body of water.

The current invention provides just such a solution by having a low-profile apparatus for converting water current into electricity. Fabric scoops are spaced along a continuous belt and, when submerged in a current of moving water, are pushed by the current thereby causing the continuous belt to move. The current pushes the fabric scoops downstream and then fold closed as the fabric scoops are rotated out of the water and travel back upstream. The moving continuous belt is used to turn an electric generator, which causes the apparatus to produce electrical energy. The apparatus includes one or more floats to support the continuous belt, electric generator, and other components of the apparatus. The apparatus can be moored or anchored in a variety of locations where there is moving water or currents. The apparatus maintains a low profile by using fabric scoops that collapse and fold flat when not submerged thereby reducing wind resistance and visible surface area above the waterline.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

SUMMARY OF THE INVENTION

The current invention is a low-profile apparatus for converting water currents, particularly slow-moving water currents, into electrical energy. It is particularly well suited for applications in water canals as well as slow moving rivers, streams, and other water ways where efficiency and a small environmental footprint are of great importance. The apparatus uses high strength fabric scoops connected to a conveyor-type continuous belt. The belt rotates around two end rollers, where the elongated belt is parallel to the water surface. As the scoops enter the water, they expand and are pushed downstream by the moving water thereby rotating the continuous belt. At least one of the end rollers is connected, preferably via gears, to an electric generator to produce electricity.

It is a principal object of the invention to provide an apparatus for efficiently producing electrical energy from slow moving water currents.

It is another object of the invention to provide an apparatus that has a low profile.

It is an additional object of the invention to provide an apparatus that can produce electricity along aqueducts or water canals to supply pumps with electricity to pump water over hills.

It is also an object of the invention to provide an apparatus that can keep canals or river bottoms clear of sediment.

It is a further object of the invention to provide an apparatus for collecting energy from breaking ocean surf and converting that energy into electricity.

It is another object of the invention to provide an apparatus that can harness energy from moving tidal waters.

It is a final object of this invention to provide an apparatus that has a low environmental impact on marine life.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

DETAILED DESCRIPTION OF THE FIGURES

Figure 1:
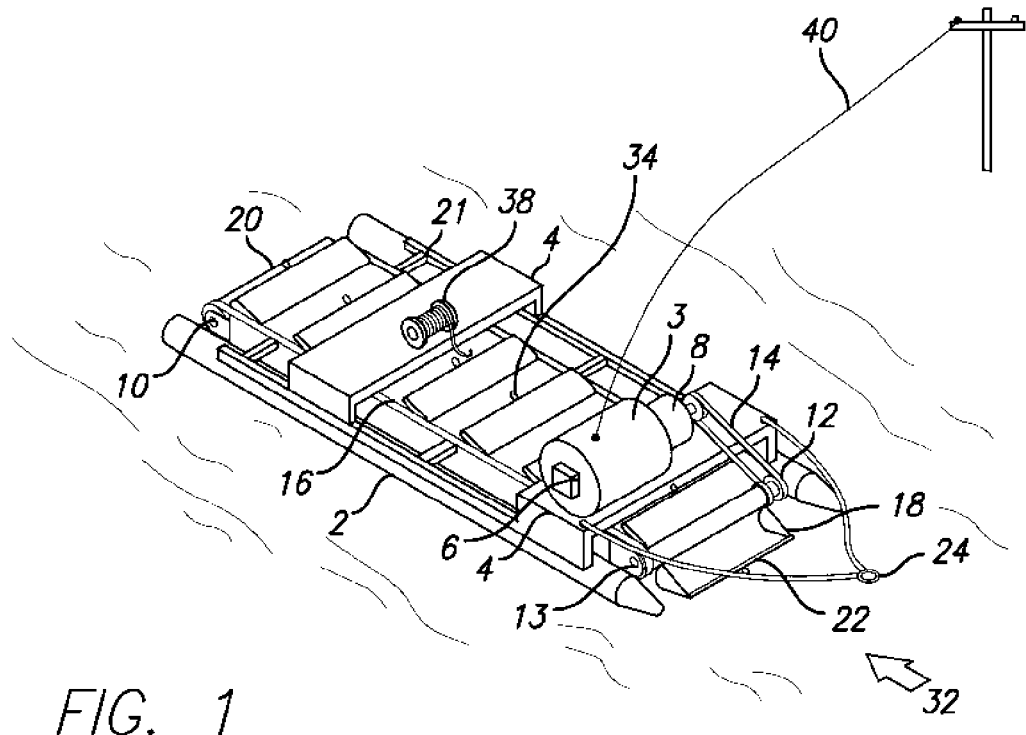
FIG. 1 is a perspective view of the invention as it sits in the water.

Many aspects of the invention can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings.

Figure 2:
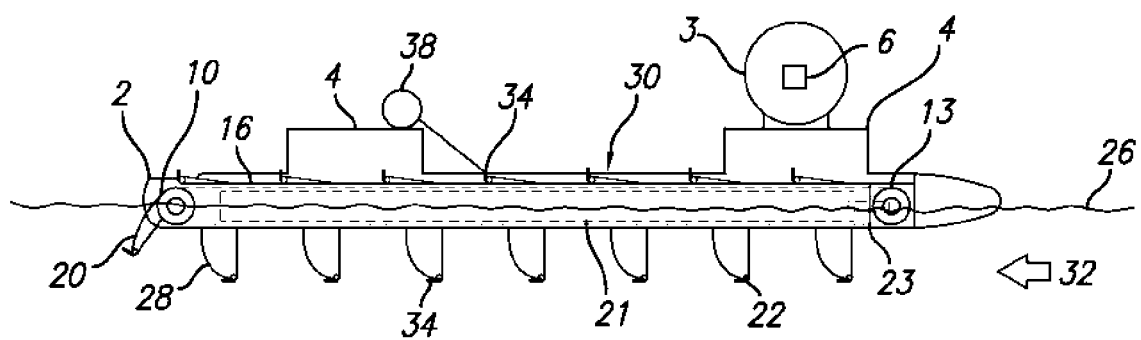
FIG. 2 is a side view of the invention.

Referring to FIG. 1 and FIG. 2, the invention converts the kinetic energy of moving water into electrical energy. Open fabric scoops 28 connected to a continuous belt 16 are pushed by moving water to turn an electric generator 3 to produce electricity.

The apparatus of the current invention includes one or more floatation devices, preferably two or more pontoons 2, that support the other components of the apparatus. The pontoons 2 should be made of a non-corrosive material to withstand the wet environment. The pontoons 2 can be ballasted such that the apparatus rests at an efficient water level 26 for collecting the kinetic energy from the moving water. While the pontoons 2 can be permanently or semi-permanently ballasted, it is contemplated by the inventor that the pontoons 2 can be dynamically ballasted such that water is filled and removed from the pontoons 2 to maintain the apparatus at the most efficient water level 26 through changing conditions.

The apparatus itself can be anchored in place or secured to the shoreline by means of a securing cable 24. The apparatus can also be secured such that it can rotate or move to match the direction of the prevailing current. This can be beneficial in locations where tides move in and out; the apparatus can match the direction of the current to efficiently capture the kinetic energy of the moving water and convert it into electrical energy.

A support frame 21 is used to connect and secure the pontoons 2 together as well as to support other various components of the apparatus. The support frame 21, however, should maintain a low profile to reduce the visual nuisance of the apparatus. Also, the support frame 21 should not focus air currents towards upstream travelling scoops, but preferably should be designed as much as possible to aerodynamically reduce wind resistance.

The support frame 21 supports two end rollers, a downstream roller 10 and an upstream roller 13, that are used to support a conveyor-type continuous belt 16. The continuous belt 16 travels around the tight radius of the end rollers. At least one of the two end rollers preferably has a pair of pressure sensing hydraulic cylinders 23 connected to each end of the end roller. The hydraulic cylinders 23, shown in FIG. 2, sense when the continuous belt 16 is displaced from the center of the upstream roller 13 and adjusts the upstream roller's 13 pitch to maintain the continuous belt 16 in the center of the upstream roller 13.

Fabric scoops are attached along the continuous belt 16. The water current, flowing in the direction 32, pushes against open fabric scoops 28 that are submerged below the water level 26. The fabric scoops include a weighted rigid bottom edge 22 that is used to aid in opening the scoop as it is submerged into the water and closing the scoop as it is removed from the water. The water current pushes the open fabric scoop 28 downstream until it reaches the downstream roller 10. The fabric scoop then closes as it rotates out of the water and transitions to a closed fabric scoop 30. FIG. 1 and FIG. 2 show a closing fabric scoop 20. Preferably, the closed fabric scoop 30 has an extremely low profile so as to create the least amount of wind resistance as it travels upstream. The closed fabric scoop 30 travels upstream on the continuous belt 16 above the water until it reaches the upstream roller 13. The fabric scoop then opens, or unfurls, as it rotates into the water and transitions back to an open fabric scoop 28. FIG. 1 shows an opening fabric scoop 18.

The fabric scoops are made from high strength fabric and expand to form underwater fabric sails. The water current pushes the open fabric scoops downstream thereby rotating the continuous belt. The scoops size and shape are preferably made to fit a specific location's water currents width and depth, as well as to meet any environmental concerns. While the fabric scoop preferably includes a weighted rigid bottom edge, it is also contemplated by the inventor that the fabric scoop includes a weighted rigid frame that defines the opening of the fabric scoop. Flexible bindings are used to attach the fabric scoops to the continuous belt to allow for travel around the small radius of the end rollers. The fabric scoops are spaced along the continuous belt such that only one scoop at a time exits or enters the water thereby reducing operating friction and further improving efficiency.

To generate electricity, the kinetic energy harnessed from the open fabric scoops 28 is transferred to an electric generator 3. In a preferred embodiment of the invention, the upstream roller 13 includes a sprocket or pulley 12. A driveline 14 connects the pulley 12 to a gear reduction assembly 8. The gear reduction assembly 8 converts the high torque, low-speed power of the driveline 4 to a low torque, higher-speed power for the electric generator 3. The higher rate of speed leads to a more efficient operation of the electric generator 3. In this manner, kinetic energy is moved from the fabric scoops to the end rollers in the form of rotational movement, which is transferred through the driveline 14 to the gear reduction assembly 8. The gear reduction assembly 8 in turn changes the rotational movement applied to the electric generator 3 by increasing the rotational speed and decreasing the torque applied by the driveline 14.

A controller 6 is also used to coordinate the optimum amount of electricity generated from the electrical generator 3. The controller 6 balances the resistance created by the electric generator 3 with the torque produced by the open fabric scoops 28 travelling downstream. The electric generator 3 and its associated components are preferably housed on a support platform 4 that is connected to the support frame 21. It is also contemplated by the inventor that the downstream roller 10 or both end rollers include a sprocket or pulley 12 that is connected to a gear reduction assembly by a driveline 14. It is also contemplated that the apparatus could include multiple electric generators 3 powered by one or more drivelines 14 from one or more end rollers.

It is intended that the apparatus of the current invention is an efficient means of converting kinetic energy from moving water into electrical energy that requires little maintenance. However, from time to time, it is likely that the apparatus will require maintenance for one reason or another. Therefore, the current invention includes a means of securing the fabric scoops in a closed position to stop the movement of the continuous belt and to aid in moving the apparatus from one location or orientation to another.

A spool 38 is housed on a support platform 4 of the apparatus. The spool 38 is wound with cable, and at the end of the cable is a hook. To secure the fabric scoops in a closed position, a user slowly unwinds the cable until the hook attaches into an eyelet 34 located on the bottom edge 22 of the fabric scoops. When a fabric scoop is in the closed position, the eyelet 34 extends vertically from the bottom edge 22. The spool 38 includes enough cable to allow the fabric scoop attached by the hook to rotate all the way downstream and back upstream above the water level 26. The cable is kept taught to prevent the other fabric scoops from opening. Closed scoops allow for the belt to be easily stopped, which allows for repair, relocation, and/or maintenance of the entire apparatus. An embodiment of the invention includes a spool 38 that is remote controlled, such that the spool can be wound and unwound without coming in direct physical contact with the apparatus.

Alternatively, the apparatus can be rotated 180 degrees such that the upstream roller 13 is located downstream. This causes the submerged fabric scoops to close and stops the rotation of the continuous belt 16. The apparatus can be returned to operational status by rotating it 180 degrees such that the upstream roller 13 is once again located upstream.

Electricity produced by the electric generator 3 is sent to land-based facilities by means of an electrical cable 40. Alternatively, energy can be stored on the apparatus to be used immediately or at a later time.

A particularly well suited application of the current device is in aqueducts with adequate water currents. The fabric scoops can be custom-sized and shaped to fit the profile of the aqueduct. Water backs up behind the fabric scoops and the aqueduct's walls thereby collecting more of the water current's energy than with an open river. Further, this same apparatus can be used to keep the bottom of the canal or aqueduct clear of sediment. The open fabric scoops travel downstream close to the bottom of the canal or aqueduct, sweeping the sediment loose.

Another well suited application of the current invention is in the breaking ocean surf. By spacing the pontoons further apart and widening the fabric scoops, the apparatus can collect the kinetic energy from the breaking waves and convert it into electrical energy. Further, an anchored sea-going vessel can deploy the apparatus to supplement the electricity necessary to power the vessel.

The various components of the apparatus are preferably composed of non-corrosive materials to withstand the wet environment in which it is intended to operate.

What I claim is:

1. A hydroelectric generator comprising:
   a means of flotation,
   two end rollers,
   a continuous belt, where the continuous belt is supported by and travels around the two end rollers, where there is a lower half and an upper half of the continuous belt supported between the two rollers, where the upper half remains above water and the lower half is submerged below water when the hydroelectric generator is in use,
   a plurality of fabric scoops, where the fabric scoops are attached to the continuous belt, where the fabric scoops are open when submerged below water and closed when above water, where the fabric scoops each further comprise an eyelet,
   a spool and cable, where the cable is stored around the spool, where the cable has a hook on one end, where the hook on one end can attach to an eyelet of a fabric scoop,
   an electric generator, and
   a means for transferring the rotational movement of at least one of the two end rollers to the electric generator,
   whereby the kinetic energy of moving water incident upon the hydroelectric generator propels the fabric scoops, which in turn causes the continuous belt to travel around the two end rollers thereby causing the two end rollers to rotate, where the kinetic energy that causes the two end rollers to rotate is transferred to the electric generator causing it to produce electricity.

2. The hydroelectric generator of claim 1, where the means of flotation is two or more pontoons.

3. The hydroelectric generator of claim 1, where the plurality of fabric scoops each further comprise a weighted rigid bottom edge, whereby the weighted rigid bottom edge aids in opening the fabric scoop when submerged and closing the fabric scoop when removed from the water.

4. The hydroelectric generator of claim 1, where the cable, when attached to the eyelet of a fabric scoop and unwound, can maintain the submerged fabric scoops in a closed position.

5. The hydroelectric generator of claim 1 further comprising a pair of hydraulic cylinders, where one of the two end rollers includes the pair of hydraulic cylinders, where the pair of hydraulic cylinders is used to maintain the continuous belt in the center of the one of the two end rollers.

6. The hydroelectric generator of claim 1, where the means of flotation, two end rollers, continuous belt, and fabric sails are made from non-corrosive materials.

7. The hydroelectric generator of claim 1, further comprising a securing cable.

8. The hydroelectric generator of claim 7, where the securing cable is used to anchor or moor the boat to a fixed location.

9. The hydroelectric generator of claim 7, where the securing cable is used to secure the hydroelectric generator to shore.

10. The hydroelectric generator of claim 1 further comprising a controller, where the controller can be used to coordinate the optimum amount of electricity generated from the electrical generator.

11. The hydroelectric generator of claim 1 further comprising a driveline and a gear reduction assembly, where the driveline is used to transfer kinetic energy in the form of rotational movement from one of the two end rollers to the gear reduction assembly, and where the gear reduction assembly increases rotational speed and decreases torque applied to the electrical generator from the driveline.

12. A hydroelectric generator comprising:
    two or more pontoons,
    two end rollers,
    a continuous belt, where the continuous belt is supported by and travels around the two end rollers, where there is a lower half and an upper half of the continuous belt supported between the two rollers, where the upper half remains above water and the lower half is submerged below water when the hydroelectric generator is in use,
    a plurality of fabric scoops, where the fabric scoops are attached to the continuous belt, where the fabric scoops are open when submerged below water and closed when above water,
    a pair of hydraulic cylinders, where one of the two end rollers includes the pair of hydraulic cylinders, where the pair of hydraulic cylinders is used to maintain the continuous belt in the center of the one of the two end rollers,
    an electric generator, and
    a means for transferring the rotational movement of at least one of the two end rollers to the electric generator,
    whereby the kinetic energy of moving water incident upon the hydroelectric generator propels the fabric scoops, which in turn causes the continuous belt to travel around the two end rollers thereby causing the two end rollers to rotate, where the kinetic energy that causes the two end rollers to rotate is transferred to the electric generator causing it to produce electricity.

13. The hydroelectric generator of claim 12, where the plurality of fabric scoops each further comprise a weighted rigid bottom edge, whereby the weighted rigid bottom edge aids in opening the fabric scoop when submerged and closing the fabric scoop when removed from the water.

14. The hydroelectric generator of claim 12, further comprising a spool and cable, where the fabric scoops each further comprise an eyelet, where the cable is stored around the spool, where the cable has a hook on one end, where the hook on one end can attach to an eyelet of a fabric scoop, where the cable, when attached to the eyelet of a fabric scoop and unwound, can maintain the submerged fabric scoops in a closed position.

15. The hydroelectric generator of claim 12 further comprising a controller, where the controller can be used to coordinate the optimum amount of electricity generated from the electrical generator.

16. The hydroelectric generator of claim 12 further comprising a driveline and a gear reduction assembly, where the driveline is used to transfer kinetic energy in the form of rotational movement from one of the two end rollers to the gear reduction assembly, and where the gear reduction assembly increases rotational speed and decreases torque applied to the electrical generator from the driveline.

17. A hydroelectric generator comprising:
    two or more pontoons,
    two end rollers,
    a continuous belt, where the continuous belt is supported by and travels around the two end rollers, where there is a lower half and an upper half of the continuous belt supported between the two rollers, where the upper half remains above water and the lower half is submerged below water when the hydroelectric generator is in use,
    a plurality of fabric scoops, where the fabric scoops are attached to the continuous belt, where the fabric scoops are open when submerged below water and closed when above water, where the plurality of fabric scoops each further comprise a weighted rigid bottom edge, whereby the weighted rigid bottom edge aids in opening the fabric scoop when submerged and closing the fabric scoop when removed from the water, where the fabric scoops each further comprise an eyelet, a spool and cable, where the cable is stored around the spool, where the cable has a hook on one end, where the hook on one end can attach to an eyelet of a fabric scoop, a pair of hydraulic cylinders, where one of the two end rollers includes the pair of hydraulic cylinders, where the pair of hydraulic cylinders is used to maintain the continuous belt in the center of the one of the two end rollers, an electric generator, and a means for transferring the rotational movement of at least one of the two end rollers to the electric generator, whereby the kinetic energy of moving water incident upon the hydroelectric generator propels the fabric scoops, which in turn causes the continuous belt to travel around the two end rollers thereby causing the two end rollers to rotate, where the kinetic energy that causes the two end rollers to rotate is transferred to the electric generator causing it to produce electricity.

18. The hydroelectric generator of claim 17 further comprising a driveline and a gear reduction assembly, where the driveline is used to transfer kinetic energy in the form of rotational movement from one of the two end rollers to the gear reduction assembly, and where the gear reduction assembly increases rotational speed and decreases torque applied to the electrical generator from the driveline.

* * * * *